(12) United States Patent
Yamamoto et al.

(10) Patent No.: US 10,535,858 B2
(45) Date of Patent: *Jan. 14, 2020

(54) SECONDARY BATTERY AND CURRENT COLLECTOR TERMINAL

(71) Applicant: TOYOTA JIDOSHA KABUSHIKI KAISHA, Toyota-shi, Aichi-ken (JP)

(72) Inventors: Satomi Yamamoto, Miyoshi (JP); Mizuho Matsumoto, Toyota (JP); Yuki Yamasaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 105 days.

This patent is subject to a terminal disclaimer.

(21) Appl. No.: 15/956,954

(22) Filed: Apr. 19, 2018

(65) Prior Publication Data

US 2018/0315981 A1 Nov. 1, 2018

(30) Foreign Application Priority Data

Apr. 28, 2017 (JP) .................. 2017-090316

(51) Int. Cl.
*H01M 2/26* (2006.01)
*H01M 10/0525* (2010.01)
*H01M 10/0585* (2010.01)
*H01M 2/30* (2006.01)

(52) U.S. Cl.
CPC ............. *H01M 2/266* (2013.01); *H01M 2/30* (2013.01); *H01M 10/0525* (2013.01); *H01M 10/0585* (2013.01)

(58) Field of Classification Search
CPC ...... H01M 10/0525; H01M 2/26; H01M 2/30; H01M 10/0585
See application file for complete search history.

(56) References Cited

U.S. PATENT DOCUMENTS

| 9,537,134 | B2 * | 1/2017 | Lee ......................... H01M 2/22 |
| 2013/0084471 | A1 * | 4/2013 | Han ....................... H01M 2/043 429/7 |
| 2017/0054136 | A1 * | 2/2017 | Byun .................... H01M 2/263 |
| 2018/0131030 | A1 * | 5/2018 | Matsuura ................ H01M 2/06 |
| 2018/0316050 | A1 * | 11/2018 | Matsumoto ....... H01M 10/0525 |

FOREIGN PATENT DOCUMENTS

| EP | 1 096 582 A1 | 5/2001 |
| JP | 10-261441 A | 9/1998 |
| JP | 2001-126707 A | 5/2001 |
| JP | 2007-299536 A | 11/2007 |
| JP | 2014-182880 A | 9/2014 |
| JP | 2015-060742 A | 3/2015 |
| KR | 10-2013-0035163 A | 4/2013 |

* cited by examiner

*Primary Examiner* — Stewart A Fraser
(74) *Attorney, Agent, or Firm* — Sughrue Mion, PLLC

(57) ABSTRACT

A secondary battery employs a stacked electrode assembly. A current collector terminal includes a base plate portion and a current collector plate portion being continuous with the base plate portion and extending along a direction orthogonal to the base plate portion. The current collector plate portion includes a plurality of slits extending from a tip end of the current collector plate portion along a direction orthogonal to the base plate portion. A cut-out is formed in at least one of an edge of the plurality of slits and an edge of the current collector plate portion extending along a direction orthogonal to the base plate portion.

12 Claims, 16 Drawing Sheets

SECONDARY BATTERY AND CURRENT COLLECTOR TERMINAL

CROSS REFERENCE TO RELATED APPLICATIONS

The present application claims priority from Japanese Patent Application No. 2017-090316 filed on Apr. 28, 2017, which is incorporated by reference herein in its entirety.

BACKGROUND

The present invention relates to secondary batteries and current collector terminals.

JP 2014-182880 A discloses a secondary battery that includes what is called a stacked electrode assembly. In the stacked electrode assembly, a plurality of positive electrode plates and a plurality of negative electrode plates are alternately stacked with separators interposed therebetween. The positive electrode sheets and the negative electrode sheets are not spirally wound. In the secondary battery disclosed in the publication, each of the positive electrode and the negative electrode includes a plurality of metal foil parts that are called tabs. The plurality of tabs are attached to a positive electrode terminal or a negative electrode terminal.

JP 2015-60742 A discloses a current interrupt mechanism provided for a current collector terminal. The publication discloses that the current interrupt mechanism is provided for a positive electrode current collector terminal. The current interrupt mechanism should be provided for at least one of the positive electrode terminal or the negative electrode terminal. The current interrupt mechanism is fitted to a battery case and a base plate portion of the positive electrode current collector terminal via a gasket and a holder member. The current interrupt mechanism includes a diaphragm plate.

SUMMARY

Each of the positive electrode sheets includes a positive electrode active material layer containing a positive electrode active material. Each of the negative electrode sheets includes a negative electrode active material layer containing a negative electrode active material. When a battery case has a larger area in which the positive electrode active material layer and the negative electrode active material layer face each other, the battery case has a greater region that contributes to the battery reaction. When this is taken into consideration, it will be appreciated that a current collector terminal that occupies less space in the battery case ensures a larger effective area within the battery case. The present application is particularly intended for what is called a stacked electrode assembly, in which the positive electrode sheets and the negative electrode sheets are alternately stacked with separators interposed therebetween and they are not in a wound configuration. For a secondary battery equipped with the stacked electrode assembly, the present application proposes a novel structure of a current collector terminal and a novel structure of a secondary battery that uses such a current collector terminal, which can improve the capacity or the energy density.

An embodiment of a secondary battery proposed herein includes a plurality of positive electrode sheets, a plurality of negative electrode sheets, a positive electrode current collector terminal, and a negative electrode current collector terminal. Each of the positive electrode sheets includes a rectangular-shaped positive electrode current collector foil and a positive electrode active material layer, provided on the positive electrode current collector foil except for an exposed portion defined along one side of the rectangular-shaped positive electrode current collector foil. Each of the negative electrode sheets includes a rectangular-shaped negative electrode current collector foil, and a negative electrode active material layer, provided on the negative electrode current collector foil except for an exposed portion defined along one side of the rectangular-shaped negative electrode current collector foil. The positive electrode active material layers and the negative electrode active material layers are alternately stacked in a thickness direction with separators interposed therebetween. The exposed portions of the plurality of positive electrode sheets protrude from one lateral side of the separators. The exposed portions of the plurality of negative electrode sheets protrude from another side of the separators that is opposite the exposed portions of the plurality of positive electrode sheets. The positive electrode current collector terminal includes a first current collector plate portion and a first base plate portion. The first current collector plate portion extends along a plane orthogonal to the exposed portions of the plurality of positive electrode sheets. The first base plate portion is continuous with the first current collector plate portion and extending along one side of the plurality of positive electrode sheets that is orthogonal to another side thereof provided with the exposed portions. The first current collector plate portion includes a plurality of slits extending from a tip end of the first current collector plate portion along a direction orthogonal to the first base plate portion. At least one cut-out is formed in at least one of an edge of the plurality of slits in the positive electrode current collector terminal and an edge of the first current collector plate portion extending along a direction orthogonal to the first base plate portion. The negative electrode current collector terminal includes a second current collector plate portion and a second base plate portion. The second current collector plate portion extends along a plane orthogonal to the exposed portions of the plurality of negative electrode sheets. The second base plate portion is continuous with the second current collector plate portion and extending along one side of the plurality of negative electrode sheets that is orthogonal to another side thereof provided with the exposed portions. The second current collector plate portion includes a plurality of slits extending from a tip end of the second current collector plate portion along a direction orthogonal to the second base plate portion. At least one cut-out is formed in at least one of an edge of the plurality of slits in the negative electrode current collector terminal and an edge of the second current collector plate portion extending along a direction orthogonal to the second base plate portion. The exposed portions of the plurality of positive electrode sheets are inserted in the slits of the positive electrode current collector terminal and interposed between opposing side edges of the slits of the positive electrode current collector terminal. The exposed portions of the plurality of negative electrode sheets are inserted in the slits of the negative electrode current collector terminal and interposed between opposing side edges of the slits of the negative electrode current collector terminal.

This embodiment makes it possible to reduce the gaps between the exposed portions and the respective opposing side edges of the slits. Moreover, it is possible to reduce deformation that can occur in the base plate portions when the exposed portions inserted into the slits are clamped.

It is also possible that the first base plate portion and the first current collector plate portion may be curvedly continuous with each other, and each of the plurality of slits in the first current collector plate portion extends into a curved portion between the first base plate portion and the first current collector plate portion. It is also possible that the second base plate portion and the second current collector plate portion may be curvedly continuous with each other, and each of the plurality of slits in the second current collector plate portion extends into a curved portion between the second base plate portion and the second current collector plate portion.

Each of the plurality of slits in the first current collector plate portion may extend to the first base plate portion. Each of the plurality of slits in the second current collector plate portion may extend to the second base plate portion.

The at least one cut-out of the positive electrode current collector terminal may be formed between the curved portion and a longitudinal midpoint of the first current collector plate portion. The at least one cut-out of the negative electrode current collector terminal may be formed between the curved portion and a longitudinal midpoint of the second current collector plate portion.

It is also possible that a plurality of cut-outs may be formed in at least one of an edge of the plurality of slits of the positive electrode current collector terminal and an edge of the first current collector plate portion extending along a direction orthogonal to the first base plate portion. It is also possible that a plurality of cut-outs may be formed in at least one of an edge of the plurality of slits of the negative electrode current collector terminal and an edge of the second current collector plate portion extending along a direction orthogonal to the second base plate portion.

In a tip end portion of the first current collector plate portion, each of the plurality of slits in the first current collector plate portion may have a width widening toward the tip end of the first current collector plate portion. In a tip end portion of the second current collector plate portion, each of the plurality of slits in the second current collector plate portion may have a width widening toward the tip end of the second current collector plate portion.

An embodiment of a current collector terminal proposed herein includes a base plate portion and a current collector plate portion. The current collector plate portion is continuous with the base plate portion and extends along a direction orthogonal to the base plate portion. The current collector plate portion includes a plurality of slits extending from a tip end of the current collector plate portion along a direction orthogonal to the base plate portion. At least one cut-out is provided in at least one of an edge of the plurality of slits and an edge of the current collector plate portion extending along a direction orthogonal to the base plate portion.

The base plate portion and the current collector plate portion may be curvedly continuous with each other. Each of the plurality of slits in the current collector plate portion may extend into the curved portion between the base plate portion and the current collector plate portion. It is possible that each of the plurality of slits may extend into the base plate portion. The at least one cut-out may be formed, for example, between the curved portion and a longitudinal midpoint of the current collector plate portion extending from the curved portion. It is also possible that a plurality of cut-outs may be formed in at least one of an edge of the plurality of slits and an edge of the current collector plate portion extending along a direction orthogonal to the base plate portion. It is also possible that, in a tip end portion of the current collector plate portion, each of the plurality of slits may have a width widening toward the tip end of the current collector plate portion.

DETAILED DESCRIPTION OF THE PREFERRED EMBODIMENTS

Hereinbelow, embodiments of a secondary battery and a current collector terminal proposed herein will be described. It should be noted that the embodiments described herein are, of course, not intended to limit the present invention. The present invention is not limited to the embodiments described herein unless specifically stated otherwise. In various embodiments herein, the features and components that exhibit the same workings are denoted by the same reference symbols when appropriate.

Figure 1:
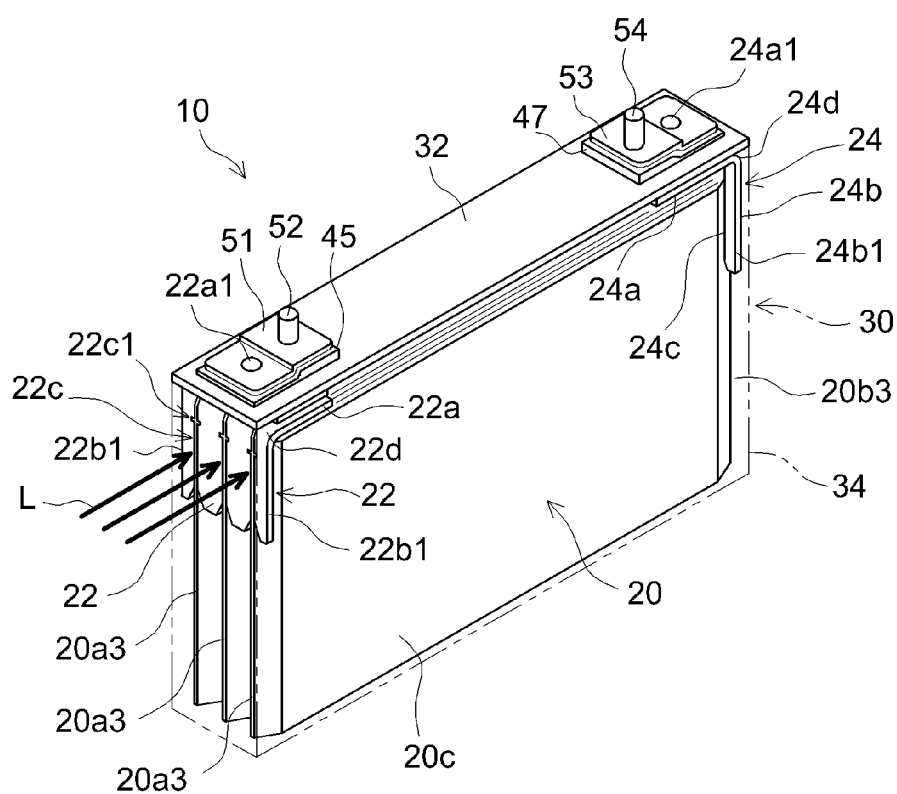
FIG. 1 is a perspective view illustrating an electrode assembly 20 of a secondary battery 10 proposed herein.
Figure 2:
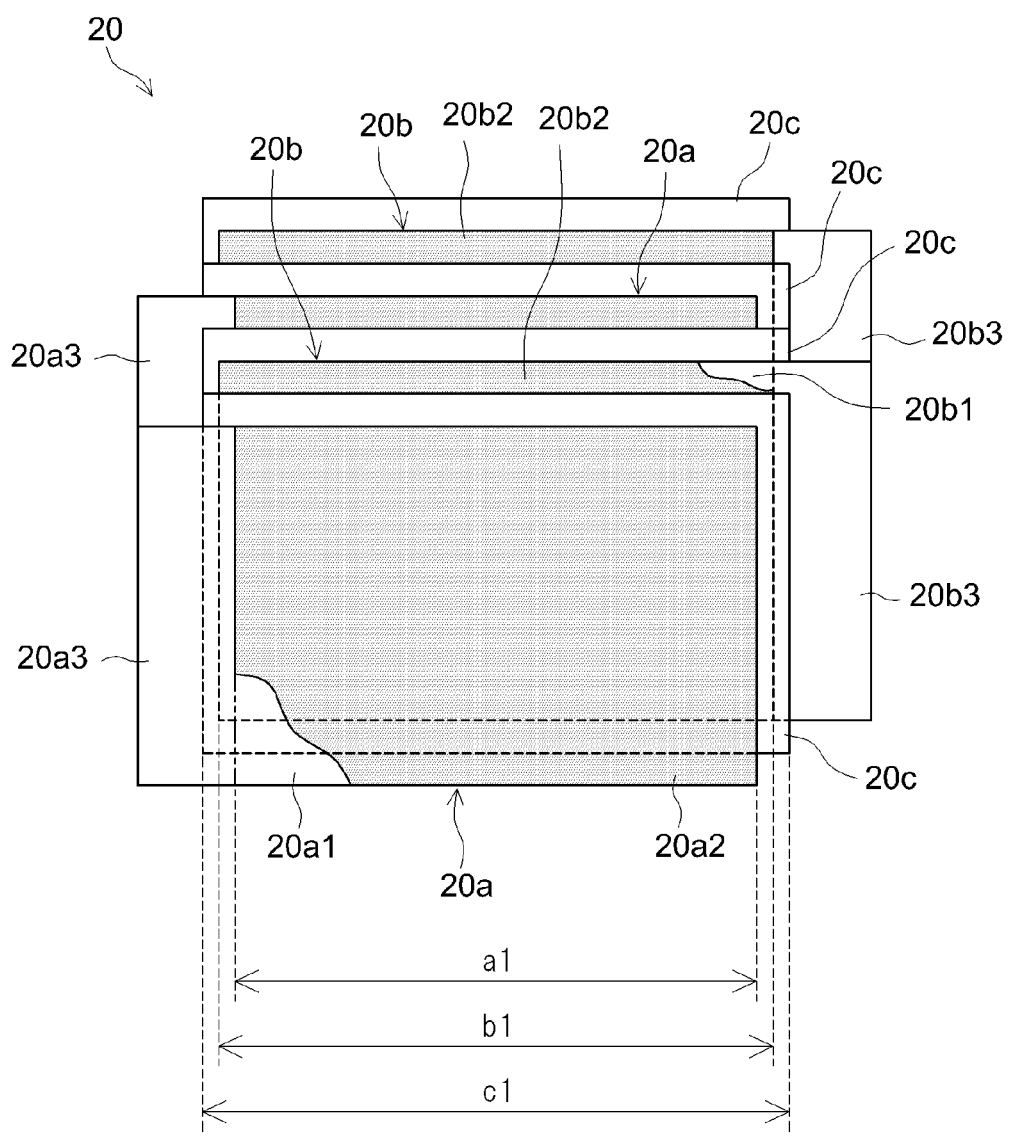
FIG. 2 is an exploded view illustrating the structure of the electrode assembly.

FIG. 1 is a perspective view illustrating an electrode assembly 20 of a secondary battery 10 proposed herein. FIG. 2 is an exploded view illustrating the structure of the electrode assembly. In the embodiment shown in FIG. 1, the electrode assembly 20 is fitted with a positive electrode current collector terminal 22 and a negative electrode current collector terminal 24. The electrode assembly 20 is fitted to a lid 32 of a battery case 30 via the positive electrode current collector terminal 22 and the negative electrode current collector terminal 24. In FIG. 1, a case main body 34 of the battery case 30 is indicated by the dash-dot-dot lines as virtual lines. The battery case 30 is what is called a prismatic case, and the case main body 34 has a closed-bottom rectangular parallelepiped shape one side face of which is open. The electrode assembly 20 attached to the lid 32 is enclosed in the case main body 34 together with electrolyte and so forth. The electrolyte may be, for example, an electrolyte solution in which a lithium salt is dissolved in an organic solvent. An example of the electrolyte solution includes a non-aqueous electrolyte solution in which an electrolyte such as $LiPF_6$ is contained in a mixed solvent of non-aqueous solvents such as ethylene carbonate (EC), dimethyl carbonate (DMC), and ethyl methyl carbonate (EMC).

As illustrated in FIG. 2, in the electrode assembly 20, a plurality of positive electrode sheets 20a and a plurality of negative electrode sheets 20b are stacked alternately with separators 20c interposed therebetween. The electrode assembly 20 is not a wound electrode assembly but what is called a stacked electrode assembly. Each of the separators 20c is formed of, for example, an electrolyte permeable porous resin sheet that possesses required heat resistance. In FIG. 2, the positive electrode sheets 20a, the negative electrode sheet 20b, and the separators 20c are shown in a staggered condition. In FIG. 2, two positive electrode sheets 20a and two negative electrode sheets 20b are stacked alternately with separators 20c interposed therebetween. In the electrode assembly 20, a larger number of positive electrode sheets 20a and a larger number of negative electrode sheets 20b are stacked alternately with separators 20c interposed therebetween.

The positive electrode sheet 20a includes a positive electrode current collector foil 20a1 and a positive electrode active material layer 20a2. The positive electrode current collector foil 20a1 is a rectangular-shaped sheet. An exposed portion 20a3 is defined along one side of the rectangular-shaped positive electrode current collector foil 20a1. The positive electrode active material layer 20a2 is provided on the positive electrode current collector foil 20a1 except for the exposed portion 20a3. In this embodiment, the positive electrode current collector foil 20a1 is an aluminum foil. The positive electrode active material layer 20a2 contains a positive electrode active material. In a lithium-ion secondary battery, the positive electrode active material is a material that releases lithium ions during charge and absorbs lithium ions during discharge, such as lithium-transition metal composite material. Other than the lithium-transition metal composite material, various materials have been proposed for use as the positive electrode active material, and the positive electrode active material is not limited to a particular material.

The negative electrode sheet 20b includes a negative electrode current collector foil 20b1 and a negative electrode active material layer 20b2. The negative electrode current collector foil 20b1 is a rectangular-shaped sheet. An exposed portion 20b3 is defined along one side of the rectangular-shaped negative electrode current collector foil 20b1. The negative electrode active material layer 20b2 is provided on the negative electrode current collector foil 20b1 except for the exposed portion 20b3. In this embodiment, the negative electrode current collector foil 20b1 is a copper foil. The negative electrode active material layer 20b2 contains a negative electrode active material. In a lithium-ion secondary battery, the negative electrode active material is a material that absorbs lithium ions during charge and releases the absorbed lithium ions during discharge, such as graphite. Other than graphite, various materials have been proposed for use as the negative electrode active material, and the negative electrode active material is not limited to a particular material.

The thickness of the positive electrode current collector foil 20a1 and the negative electrode current collector foil 20b1 is, for example, from about 8 μm to about 20 μm. In this embodiment, it is desirable that the thickness of the positive electrode active material layer 20a2 and the negative electrode active material layer 20b2 be set to, for example, about 20 μm to about 200 μm in total of both surfaces of the positive electrode current collector foil 20a1 and the negative electrode current collector foil 20b1.

The positive electrode active material layers 20a2 and the negative electrode active material layers 20b2 are alternately stacked in a thickness direction with the separators 20c interposed therebetween. Herein, the width b1 of the negative electrode active material layer 20b2 is wider than the width a1 of the positive electrode active material layer 20a2, and the width c1 of the separator 20c is wider than the width b1 of the negative electrode active material layer 20b2. The positive electrode active material layer 20a2 is stacked so as to be covered by the negative electrode active material layer 20b2. Moreover, the positive electrode active material layer 20a2 and the negative electrode active material layer 20b2 are stacked so as to be covered by the separator 20c.

The exposed portions 20a3 of the plurality of positive electrode sheets 20a (that is, the parts in which the positive electrode active material layer 20a2 is not formed on the positive electrode current collector foil 20a1) protrude from one lateral side of the separators 20c. The exposed portions 20b3 of the plurality of negative electrode sheets 20b protrude from another side of the separators 20c that is opposite the exposed portions 20a3 of the plurality of positive electrode sheets 20a.

Figure 3:
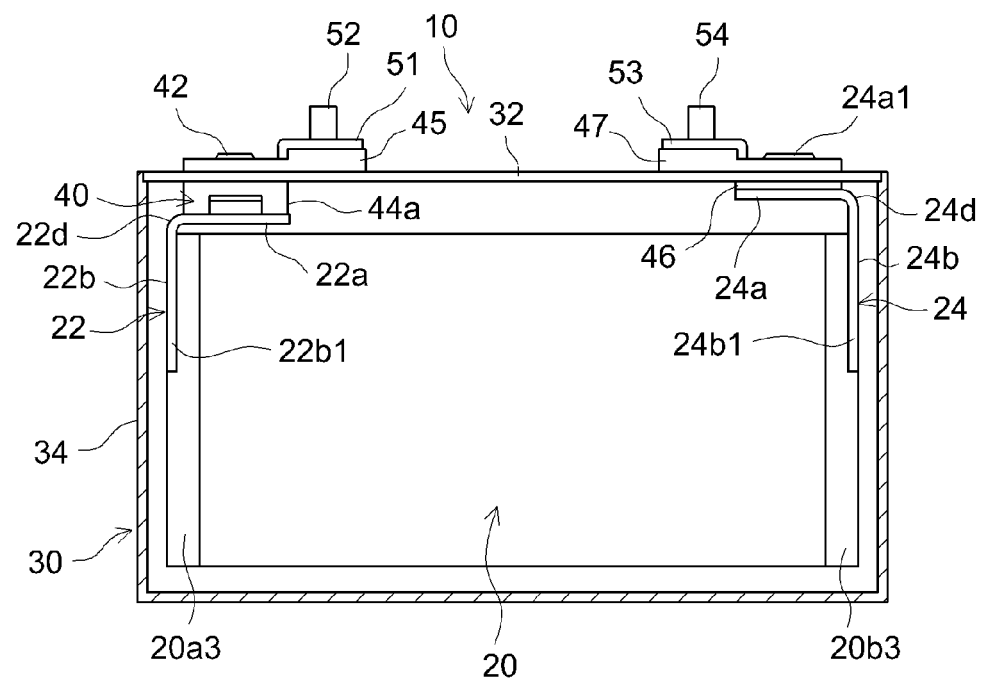
FIG. 3 is a front view illustrating the internal structure of the secondary battery 10.
Figure 4:
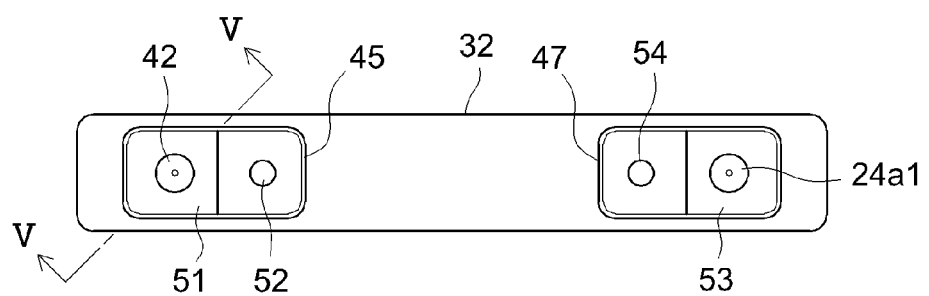
FIG. 4 is a plan view of a lid 32 fitted with current collector terminals.
Figure 5:
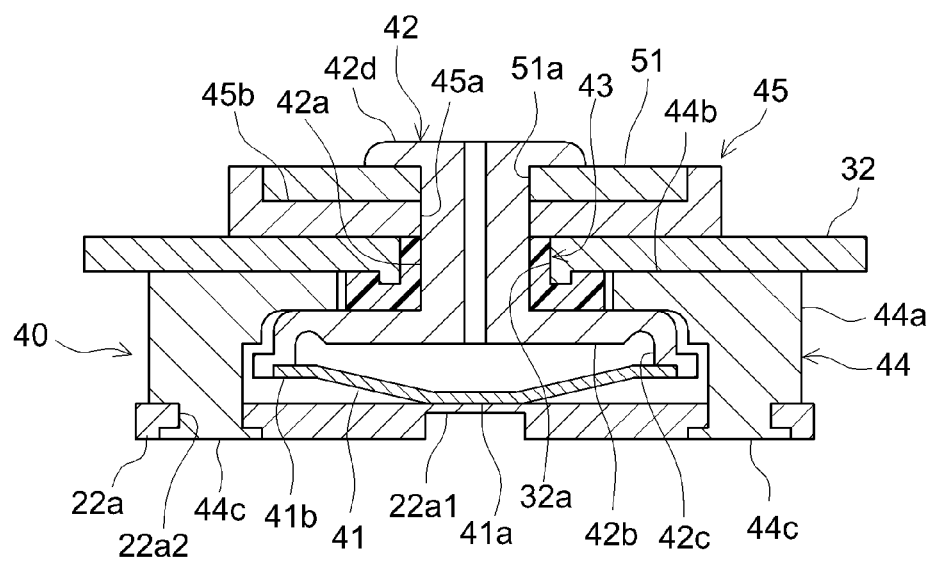
FIG. 5 is a cross-sectional view illustrating a current interrupt mechanism 40.
Figure 6:
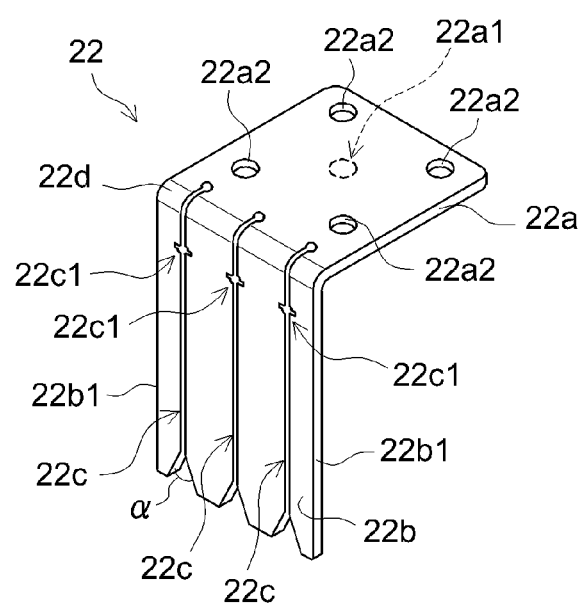
FIG. 6 is a perspective view illustrating a positive electrode current collector terminal 22.
Figure 7:
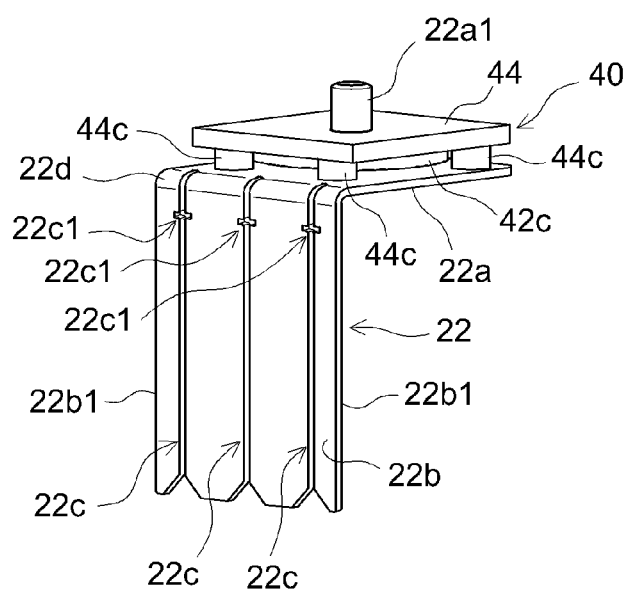
FIG. 7 is a perspective view illustrating the positive electrode current collector terminal 22 assembled to an assembly of the current interrupt mechanism 40.
Figure 8:
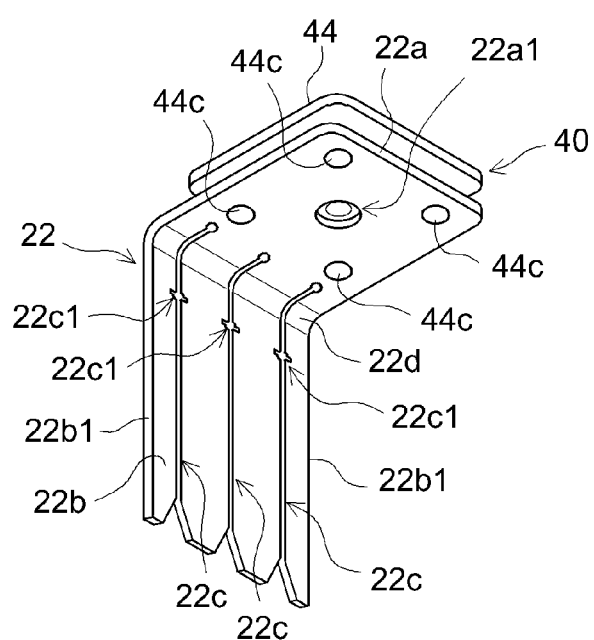
FIG. 8 is a perspective view illustrating the positive electrode current collector terminal 22 fitted with the current interrupt mechanism 40, viewed from inside.
Figure 9:
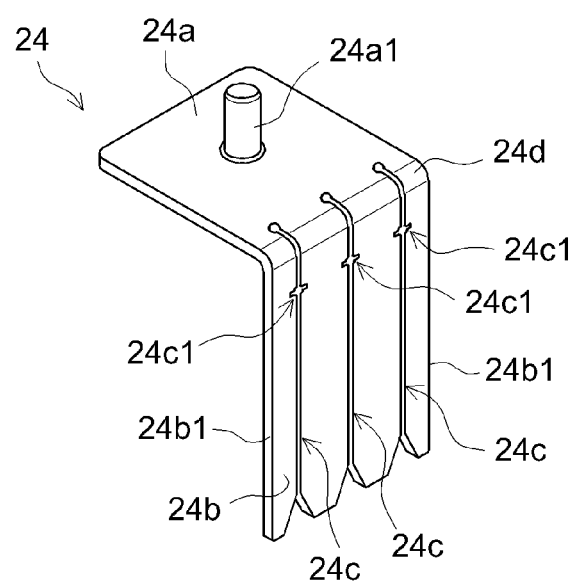
FIG. 9 is a perspective view illustrating a negative electrode current collector terminal 24.
Figure 10:
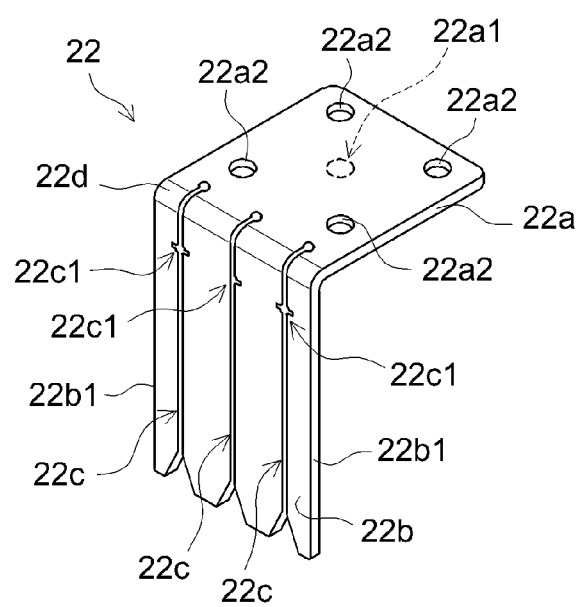
FIG. 10 is a perspective view illustrating a modified example of the positive electrode current collector terminal 22.
Figure 11:
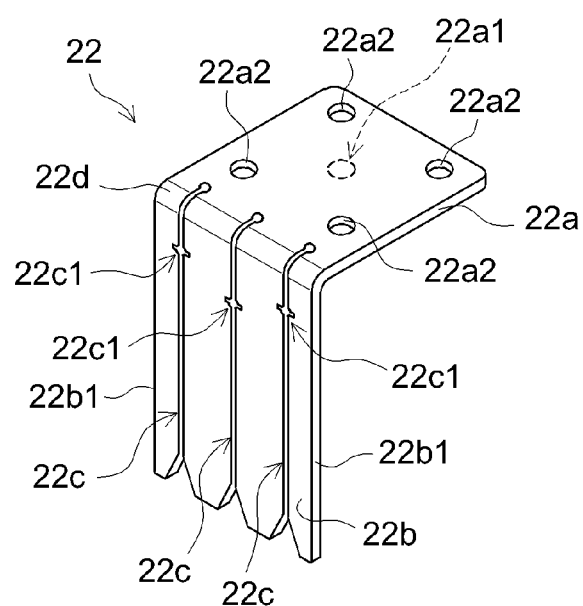
FIG. 11 is a perspective view illustrating a modified example of the positive electrode current collector terminal 22.
Figure 12:
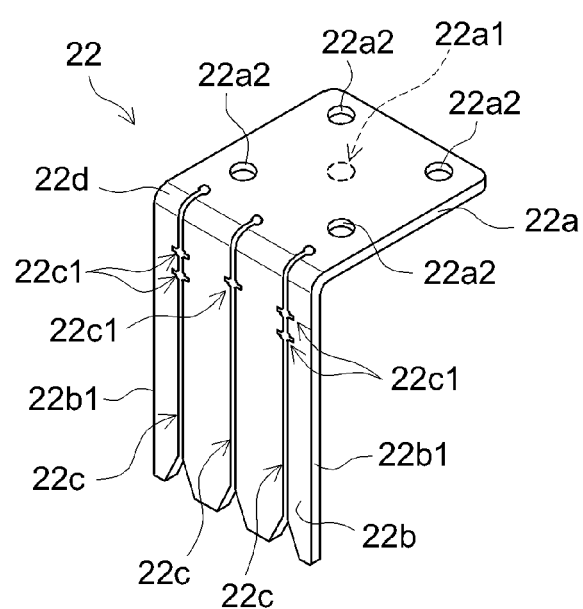
FIG. 12 is a perspective view illustrating a modified example of the positive electrode current collector terminal 22.

The exposed portions 20a3 of the plurality of positive electrode sheets 20a, which protrude from the parts at which the positive electrode active material layers 20a2 and the negative electrode active material layers 20b2 are overlapped, are welded to the positive electrode current collector terminal 22, as illustrated in FIG. 1. At the other end opposite to the exposed portions 20a3 of the plurality of positive electrode sheets 20a, the exposed portions 20b3 of the plurality of negative electrode sheets 20b are welded to the negative electrode current collector terminal 24. FIG. 3 is a front view illustrating the internal structure of the secondary battery 10. As illustrated in FIG. 3, the positive electrode current collector terminal 22 is fitted to the lid 32 with a current interrupt mechanism 40 interposed therebetween. FIG. 4 is a plan view of the lid 32. FIG. 5 is a cross-sectional view illustrating a current interrupt mechanism 40. FIG. 5 shows a cross section taken along line V-V in FIG. 4. FIG. 6 is a perspective view illustrating a positive electrode current collector terminal 22. FIG. 7 is a perspective view illustrating the positive electrode current collector terminal 22 assembled to an assembly of the current interrupt mechanism 40. FIG. 8 is a perspective view illustrating the positive electrode current collector terminal 22 fitted with the current interrupt mechanism 40, viewed from inside. FIG. 9 is a perspective view illustrating the negative electrode current collector terminal 24.

As illustrated in FIG. 5, the current interrupt mechanism 40 includes a diaphragm plate 41, a connecting member 42, a gasket 43, a holder member 44, and an insulator 45. The lid 32 includes a mounting hole 32a at a position where the current interrupt mechanism 40 is to be fitted. The gasket 43 is an electrically insulative tubular member that is hermetically fitted to the mounting hole 32a of the lid 32. The holder member 44 is fitted to the inner surface of the lid 32 around the gasket 43. The holder member 44 includes a trunk portion 44a, an inner flange 44b, and fastening portions 44c. The trunk portion 44a is a substantially cylindrical part. The inner flange 44b is provided on one end of the trunk portion 44a. The inner flange 44b protrudes radially inwardly at one end of the trunk portion 44a. The inner flange 44b abuts on the inner surface of the lid 32 around the gasket 43. The trunk portion 44a protrudes from the inside of the lid 32. The fastening portions 44c are provided on the other end of the trunk portion 44a, and they are parts to be attached to the positive electrode current collector terminal 22.

The connecting member 42 is a tubular member that includes a shaft portion 42a, a disk portion 42b, a circumferential edge portion 42c, and an outer flange portion 42d. The shaft portion 42a is a part that is to be fitted to the gasket 43. One end of the shaft portion 42a extends toward the inside of the lid 32 via the gasket 43. The disk portion 42b is provided at one end of the shaft portion 42a. The disk portion 42b extends radially outward of the shaft portion 42a with the gasket 43 and the inner flange 44b of the holder member 44 interposed between the disk portion 42b and the inside of the lid 32. The circumferential edge portion 42c is a tubular part extending away from the lid 32 at the outer peripheral edge of the disk portion 42b. The diaphragm plate 41 is a thin plate member that includes a flat portion 41a at its center and has a substantially circular conic shape that is gradually depressed toward the center. The outer peripheral edge 41b of the diaphragm plate 41 is welded to the tip of the circumferential edge portion 42c.

The insulator 45 is an electrically insulative resin member. The insulator 45 includes a through hole 45a and a seat portion 45b. The through hole 45a is a hole through which the shaft portion 42a of the connecting member 42 is inserted. The seat portion 45b is a recess that serves to dispose an external terminal 51 at a predetermined position. The insulator 45 is disposed on an outer surface of the lid 32 by inserting the shaft portion 42a of the connecting member 42 through the through hole 45a. The seat portion 45b is provided in the surface of the insulator 45. The external terminal 51 is formed with an attachment hole 51a to be attached to the shaft portion 42a of the connecting member 42. The external terminal 51 is attached to the shaft portion 42a of the connecting member 42 and is disposed on the seat portion 45b of the insulator 45. The outer flange portion 42d is provided at a tip end of the shaft portion 42a. The outer flange portion 42d is a tip end part of the shaft portion 42a that is pressed and extended so as to be fastened around the attachment hole 51a of the external terminal 51, which is disposed on the seat portion 45b of the insulator 45.

As illustrated in FIGS. 3 and 6, the positive electrode current collector terminal 22 includes a base plate portion 22a and a current collector plate portion 22b. In this embodiment, the base plate portion 22a is a flat-shaped part provided with a thin portion 22a1 formed at its center. Attachment holes 22a2 for attaching the current interrupt mechanism 40 are formed at four corners of the base plate portion 22a of the positive electrode current collector terminal 22. As illustrated in FIG. 5, a central portion of the diaphragm plate 41 of the current interrupt mechanism 40 is welded to the thin portion 22a1. The attachment holes 22a2 are fitted to the fastening portions 44c of the holder member 44 of the current interrupt mechanism 40. The current collector plate portion 22b is continuous with the base plate portion 22a and extends along a direction orthogonal to the base plate portion 22a.

In this embodiment, the current collector plate portion 22b is in a flat plate shape. The current collector plate portion 22b is formed with a plurality of slits 22c extending from a tip end of the current collector plate portion 22b along a direction orthogonal to the base plate portion 22a. In the example shown in FIG. 6, the number of the slits 22c is 3. The number of the slits 22c is not limited to this embodiment, but it is desirable that two or more slits 22c be provided. Herein, the base plate portion 22a of the positive electrode current collector terminal 22 is referred to as a "first base plate portion" when appropriate. The current collector plate portion 22b of the positive electrode current collector terminal 22 is referred to as a "first current collector plate portion" when appropriate.

As illustrated in FIG. 1, the exposed portions 20a3 of the positive electrode sheets 20a are gathered into bundles, and the bundled exposed portions 20a3 are respectively inserted in the plurality of slits 22c. For this reason, it is desirable that the width (i.e., gap) of the plurality of slits 22c be set to a predetermined width such that the bundled exposed portions 20a3 of the positive electrode sheets 20a can be inserted therein.

In a tip end portion of the current collector plate portion 22b, each of the plurality of slits 22c has a width (i.e., gap) widening toward the tip end of the current collector plate portion 22b. In this embodiment, the tip end portion of each of the slits 22c gradually widens. For example, it is desirable that, in the tip end portion of the current collector plate portion 22b, opposing side edges of the slit 22c widen at an angle $\alpha$ in the range of from about 45 degrees to about 70 degrees.

In this embodiment, a portion between the base plate portion 22a and the current collector plate portion 22b is bent curvedly. The plurality of slits 22c extend continuously to the curved portion 22d between the base plate portion 22a and the current collector plate portion 22b. In this embodiment, each of the plurality of slits 22c further extends into the base plate portion 22a.

A cut-out 22c1 is formed at an appropriate position in an edge of each of the plurality of slits 22c. In this embodiment, all the plurality of slits 22c of the positive electrode current collector terminal 22 are provided with the cut-out 22c1, which is formed in each of opposing side edges of all the slits 22c. Each of the cut-outs 22c1 is formed between the curved portion 22d and a longitudinal midpoint of the current collector plate portion 22b extending from the curved portion 22d. The cut-out 22c1 should desirably be formed, for example, within a region 20 mm from the curved portion 22d-side end of an outer side surface of the current collector plate portion 22b in a length direction of the current collector plate portion 22b. It is desirable, for example, that the cut-out 22c1 be a notch formed in a direction orthogonal to a direction in which the slits 22c extend (in other words, in a direction orthogonal to the length of the current collector plate portion 22b extending from the base plate portion 22a). The shape of the cut-out 22c1 is not limited to any particular shape. The cut-out 22c1 may be, for example, a cut-out formed by cutting the edge of the slit 22c in a semicircular shape, or a notch formed by cutting the edge of the slit 22c in a V-shape. The width of the cut-out 22c1, from which the edge of the slit 22c is cut away by the cut-out 22c1, should desirably be, for example, approximately equal to the thickness of the current collector plate portion 22b.

In this secondary battery 10, as illustrated in FIG. 1, the exposed portions 20a3 of the positive electrode sheets 20a are gathered into three bundles, which are respectively fitted into the slits 22c formed in the current collector plate portion 22b of the positive electrode current collector terminal 22. Specifically, at one lateral side of the electrode assembly 20, in which the positive electrode sheets 20a and the negative electrode sheets 20b are stacked, the tip end of the current collector plate portion 22b of the positive electrode current collector terminal 22 is brought to the exposed portions 20a3 of the positive electrode sheets 20a, which protrude from the separators 20c, from above. Then, the exposed portions 20a3 of the positive electrode sheets 20a are bundled and inserted respectively into a plurality (three in this embodiment) of slits 22c, which are formed in the current collector plate portion 22b, in such a manner that the bundled exposed portions 20a3 are inserted respectively into the slits 22c along the flared portion of each of the slits 22c.

It is desirable that guide sheets be interposed at appropriate positions when stacking the positive electrode sheets 20a so that the exposed portions 20a3 can be smoothly bundled correspondingly to the plurality of slits 22c formed in the current collector plate portion 22b. It is desirable that a predetermined number of the exposed portions 20a3 should be bundled and guided by the guide sheets into each of the slits 22c and the bundled exposed portions 20a3 should be inserted into the slits 22c. As illustrated in FIG. 1, the sheets used for guiding the exposed portions 20a3 should be removed after the exposed portions 20a3 are fitted into the slits 22c. Alternatively, it is possible that, before guiding the slits 22c of the positive electrode current collector terminal 22 toward the exposed portions 20a3, the exposed portions 20a3 be gathered into appropriate bundles and retained by, for example, a gripping hand or the like that is provided for the manufacturing facility.

Next, as illustrated in FIG. 1, after the exposed portions 20a3 are fitted into the slits 22c, two opposite side edges 22b1 of the current collector plate portion 22b are clamped and pressed together to clamp the exposed portions 20a3 fitted into the slits 22c. The cut-outs 22c1 are formed in the edges of the slits 22c of the positive electrode current collector terminal 22. When clamping and pressing the two opposite side edges 22b1 of the current collector plate portion 22b to clamp the exposed portions 20a3 fitted in the slits 22c, opposing side edges of the slits 22c deform from the cut-outs 22c1, which serve as starting points of the deformation.

This serves to reduce the press load that is required to clamp the exposed portions 20a3 fitted in the slits 22c. Moreover, because the opposing side edges of the slits 22c deform from the cut-outs 22c1, serving as starting points of deformation, when clamping the exposed portions 20a3 fitted in the slits 22c, the opposing side edges of the slits 22c deform along the exposed portions 20a3 fitted in the slits 22c. This serves to reduce the gaps produced between the opposing side edges of the slits 22c and the exposed portions 20a3. Furthermore, in this embodiment, the cut-outs 22c1 are formed between the curved portion 22d and the longitudinal midpoint of the current collector plate portion 22b extending from the curved portion 22d. This enables the opposing side edges of the slits 22c to deform at a point closer to the base plate portion 22a. As a result, the opposing side edges of the slits 22c are provided with the parts that are sufficiently in intimate contact with the exposed portions 20a3.

Thus, the gaps between the slits 22c and the exposed portions 20a3 are reduced. Under this condition, laser light L is applied to the slits 22c and the exposed portions 20a3 interposed between the slits 22c to laser weld the current collector plate portion 22b and the exposed portions 20a3 of the positive electrode sheets 20a to each other. This enables the positive electrode sheets 20a and the positive electrode current collector terminal 22 to be welded together with a sufficient strength.

When clamping the exposed portions 20a3 fitted in the slits 22c, the opposing side edges of the slits 22c deform from the cut-outs 22c1, which serve as starting points of deformation. Because the deformation that occurs in the current collector plate portion 22b starts at the cut-outs 22c1, warpage that occurs in the base plate portion 22a is small. For example, when clamping and pressing the two side edges 22b1 of the current collector plate portion 22b, a force is produced such as to bend the base plate portion 22a outward. Such a force is reduced, so the deformation such as to bend the base plate portion 22a outward is kept small.

As illustrated in FIG. 3, the current interrupt mechanism 40 may be provided on the base plate portion 22a of the positive electrode current collector terminal 22. For the current interrupt mechanism 40, the thin portion 22a1 is provided at the center of the base plate portion 22a, and the diaphragm plate 41 is welded thereto. Because the base plate portion 22a is unlikely to cause warpage, the diaphragm plate 41, which is welded to the thin portion 22a1, is also unlikely to cause a faulty action.

As illustrated in FIGS. 3 and 4, the negative electrode current collector terminal 24 includes a base plate portion 24a and a current collector plate portion 24b. The current collector plate portion 24b is continuous with the base plate portion 24a and extends along a direction orthogonal to the base plate portion 24a. In this embodiment, the base plate portion 24a is provided with a protuberance 24a1 extending outside of the battery case 30. The protuberance 24a1 is a part that is to be connected to the external terminal 53.

In this embodiment, the current collector plate portion 24b is in a flat plate shape. In addition, as illustrated in FIG. 9, the current collector plate portion 24b includes a plurality of slits 24c extending from a tip end of the current collector plate portion 24b along a direction orthogonal to the base plate portion 24a. Moreover, a cut-out 24c1 is formed in each of opposing side edges of all the slits 24c.

The exposed portions 20b3 of the negative electrode sheets 20b are bundled and fitted into the slits 24c, which are formed in the current collector plate portion 24b. After the exposed portions 20b3 are fitted into the slits 24c, two opposite side edges 24b1 of the current collector plate portion 24b are clamped and pressed so as to clamp the exposed portions 20b3 fitted into the slits 24c. The slits 24c of the negative electrode current collector terminal 24 include the cut-outs 24c1 formed therein. When clamping and pressing the two opposite side edges 24b1 of the current collector plate portion 24b to clamp the exposed portions 20b3 fitted in the slits 24c, opposing side edges of the slits 24c deform from the cut-outs 24c1, which serve as the starting points of deformation. This serves to reduce the press load that is required to clamp the exposed portions 20b3 fitted in the slits 24c.

Moreover, because the opposing side edges of the slits 24c deform from the cut-outs 24c1 serving as starting points of deformation when clamping the exposed portions 20b3 fitted in the slits 24c, the opposing side edges of the slits 24c deform along the exposed portions 20b3 fitted in the slits 24c. This serves to reduce the gaps produced between the opposing side edges of the slits 24c and the exposed portions 20b3. Furthermore, in this embodiment, the cut-outs 24c1 are formed between the curved portion 24d and the longitudinal midpoint of the base plate portion 24a extending from the curved portion 24d. This enables the opposing side edges of the slits 24c to deform at a point closer to the base plate portion 24a. As a result, the opposing side edges of the slits 24c are provided with the parts that are sufficiently in intimate contact with the exposed portions 20b3.

In addition, when clamping and pressing the two side edges 24b1 of the current collector plate portion 24b to clamp the exposed portions 20b3 fitted in the slits 24c, the deformation that occurs in the base plate portion 24a can be kept small. As illustrated in FIG. 3, the negative electrode current collector terminal 24 is fitted to the lid 32 via a gasket 46 and an insulator 47, and is connected to the external terminal 53. The lid 32 is formed with an attachment hole (not shown) at a position where the negative electrode current collector terminal 24 is to be fitted. The gasket 46 is fitted on the inner surface of the lid 32 and around the attachment hole. The negative electrode current collector terminal 24 is fitted so that the protuberance 24a1 provided on the base plate portion 24a is fitted to the attachment hole of the lid 32 via the gasket 46 from the inside of the lid 32. The insulator 47 and the external terminal 53 has a through hole (not shown) through which the protuberance 24a1 is inserted. The protuberance 24a1 protruding outside of the lid 32 is inserted through the through hole of the insulator 47 and through the through hole of the external terminal 53 fitted on the insulator 47 to attach the insulator 47 and the external terminal 53 thereto. Then, the tip end of the protuberance 24a1 is pressed and extended so as to be fastened around the through hole of the external terminal 53.

Because the negative electrode current collector terminal 24 is formed with the cut-outs 24c1 in the slits 24c, deformation that occurs in the base plate portion 24a is kept small. For this reason, a gap does not easily form between the negative electrode current collector terminal 24 and the gasket 46 and the lid 32, and from the viewpoint of ensuring hermeticity, a problem is unlikely to occur.

The exposed portions 20b3 are clamped between the slits 24c and laser-welded, so as to be connected to the negative electrode current collector terminal 24. Thus, the negative electrode sheets 20b and the negative electrode current collector terminal 24 are welded together. Herein, the base plate portion 24a of the negative electrode current collector terminal 24 is referred to as a "second base plate portion" when appropriate, so that it can be distinguished from the base plate portion 22a of the positive electrode current collector terminal 22. The current collector plate portion 24b of the negative electrode current collector terminal 24 is referred to as a "second current collector plate portion" when appropriate, so that it can be distinguished from the current collector plate portion 22b of the positive electrode current collector terminal 22.

In this embodiment, the respective current collector plate portions 22b and 24b of the positive electrode current collector terminal 22 and the negative electrode current collector terminal 24 have substantially the same structure. Also, the process of fitting the exposed portions 20b3 of the negative electrode sheets 20b into the slits 24c, formed in the current collector plate portion 24b of the negative electrode current collector terminal 24 and welding the exposed portions 20b3 to the current collector plate portion 24b is similar to the process for the positive electrode current collector terminal 22. The description of these structures and processes will not be repeated.

Here, the positive electrode current collector terminal 22 and the negative electrode current collector terminal 24 may be formed in the following manner. A plate material made of a metal is punched out into a predetermined shape corresponding to the base plate portions 22a and 24a and the current collector plate portions 22b and 24b, then slits corresponding to the plurality of slits 22c and 24c are formed therein, and thereafter, the punched-out materials are bent to form the positive electrode current collector terminal 22 and the negative electrode current collector terminal 24. Each of the positive electrode current collector terminal 22 and the negative electrode current collector terminal 24 should be made of a material that can withstand a predetermined potential during the battery reactions. It is desirable that the positive electrode current collector terminal 22 be made of, for example, aluminum or an aluminum alloy. It is desirable that the negative electrode current collector terminal 24 be made of, for example, copper or a copper alloy. The base plate portion 22a and the current collector plate portion 22b of the positive electrode current collector terminal 22 as well as the base plate portion 24a and the current collector plate portion 24b of the negative electrode current collector terminal 24 are in a plate shape, and each of them should desirably have a predetermined thickness.

FIG. 3 is a front view illustrating the positive electrode current collector terminal 22 and a negative electrode current collector terminal 24 that are fitted to the electrode assembly 20. In the secondary battery 10, the positive electrode current collector terminal 22 and the negative electrode current collector terminal 24 include the base plate portions 22a and 24a and the current collector plate portions 22b and 24b, respectively, each of which is in a plate-shaped. The base plate portions 22a and 24a and the current collector plate portions 22b and 24b are arranged to form substantially a right angle at the curved portions 22d and 24d, and disposed so as to fit the corner portions of the electrode assembly 20. In this embodiment, each of the positive electrode current collector terminal 22 and the negative electrode current collector terminal 24 is in a plate shape, to reduce the space occupied by the positive electrode current collector terminal 22 and the negative electrode current collector terminal 24.

The electrode assembly 20, the positive electrode current collector terminal 22, and the negative electrode current collector terminal 24 are placed inside the battery case 30 along with a gasket, an insulating film, or the like. Because the positive electrode current collector terminal 22 and the negative electrode current collector terminal 24 can be arranged compactly in the battery case 30, it is possible to increase the size of the electrode assembly 20. In particular, the area in which the positive electrode active material layers 20a2 and the negative electrode active material layers 20b2 overlap is allowed to be larger. In other words, it is possible to ensure a large effective area of the positive electrode active material layer 20a2 and the negative electrode active material layer 20b2, which contributes to the battery reaction. This enables the secondary battery to have a higher battery capacity, with the volume of the secondary battery being equal. In other words, it is possible to provide a secondary battery with a higher capacity and a higher energy density.

In this embodiment, in each of tip end portions of the current collector plate portions 22b and 24b, each of the plurality of slits 22c and 24c, which are respectively formed in the current collector plate portions 22b and 24b of the positive electrode current collector terminal 22 and the negative electrode current collector terminal 24, has a width widening toward the tip end of each of the current collector plate portions 22b and 24b. As described above, the positive electrode current collector terminal 22 and the negative electrode current collector terminal 24 configured in such a manner allow the exposed portions 20a3 of the positive electrode sheets 20a and the exposed portions 20b3 of the negative electrode sheets 20b to be inserted respectively into the slits 22c and 24c by bringing the current collector plate portions 22b and 24b close to the exposed portions 20a3 and the exposed portions 20b3 from the upper end of the electrode assembly 20. Here, the upper end of the electrode assembly 20 is, in other words, an end of the electrode assembly 20 on which the base plate portions 22a and 24a are arranged so as to face the electrode assembly 20 (i.e., an end of the electrode assembly 20 facing the lid 32).

The exposed portions 20a3 of the positive electrode sheets 20a and the exposed portions 20b3 of the negative electrode sheets 20b are bundles of thin sheets, so they are likely to bend easily when pressed in a longitudinal direction of the sheets (i.e., in the direction in which they protrude from the separators 20c). However, the exposed portions 20a3 of the positive electrode sheets 20a and the exposed portions 20b3 of the negative electrode sheets 20b are inserted into the slits of the positive electrode current collector terminal 22 and the negative electrode current collector terminal 24 from the edges on the side orthogonal to the longitudinal direction of the sheets. For this reason, the exposed portions 20a3 of the positive electrode sheets 20a and the exposed portions 20b3 of the negative electrode sheets 20b are unlikely to bend when inserted into the slits of the positive electrode current collector terminal 22 and the negative electrode current collector terminal 24. Moreover, in this embodiment, in the tip end portion of each of the current collector plate portions 22b and 24b, each of the slits 22c and 24c has a width widening toward the tip end of each of the current collector plate portions 22b and 24b. Therefore, handling is easy when inserting the exposed portions 20a3 of the positive electrode sheets 20a and the exposed portions 20b3 of the negative electrode sheets 20b into the slits 22c and 24c.

In this embodiment, each of the current collector plate portions 22b and 24b is in a flat plate shape. Accordingly, the slits 22c and 24c are provided linearly along the direction in which exposed portions 20a3 of the positive electrode sheets 20a and the exposed portions 20b3 of the negative electrode sheets 20b are inserted, so the exposed portions 20a3 of the positive electrode sheets 20a and the exposed portions 20b3 of the negative electrode sheets 20b can easily be inserted into the slits 22c and 24c. Moreover, it is possible to arrange the current collector plate portions 22b and 24b to be closer to the region in which the positive electrode active material layers 20a2 and the negative electrode active material layers 20b2 overlap in the electrode assembly 20. This contributes to increasing the area in which the positive electrode active material layers 20a2 and the negative electrode active material layers 20b2 overlap. In other words, it is possible to ensure a large effective area of the positive electrode active material layer 20a2 and the negative electrode active material layer 20b2, which contributes to the battery reaction. This enables the secondary battery to have a higher battery capacity.

In this embodiment, in the positive electrode current collector terminal 22 and the negative electrode current collector terminal 24, the base plate portions 22a and 24a are curvedly continuous with the current collector plate portions 22b and 24b, respectively. The plurality of slits 22c and 24c formed in the current collector plate portions 22b and 24b respectively extend into the curved portions 22d and 24d provided between the base plate portions 22a and 24a and the current collector plate portions 22b and 24b. As described above, the exposed portions 20a3 of the positive electrode sheets 20a and the exposed portions 20b3 of the negative electrode sheets 20b are inserted respectively into the plurality of slits 22c and 24c, which are formed in the current collector plate portions 22b and 24b.

Thereafter, the two opposite side edges 22b1, 24b1 of the current collector plate portions 22b, 24b are clamped and pressed so as to clamp the exposed portions 20a3, 20b3 by the opposing side edges of the slits 22c, 24c. In this case, the cut-outs 22c1, 24c1 are formed in the opposing side edges of the slits 22c, 24c. As a result, the opposing side edges of the slits 22c, 24c deform from the cut-outs 22c1, 24c1, serving as starting points of deformation. Thus, the gaps between the slits 22c, 24c and the exposed portions 20a3, 20b3 are reduced. Moreover, the opposing side edges of the slits 22c, 24c deform at the cut-outs 22c1, 24c1, serving as starting points of deformation. Therefore, the warpage resulting from the deformation is unlikely to extend to the base plate portions 22a and 24a. As a result, warpage that occurs in the base plate portions 22a and 24a is smaller than that when such cut-outs 22c1 and 24c1 are not formed.

In this embodiment, as illustrated in FIG. 5, various members of the current interrupt mechanism 40 are fitted to the base plate portion 22a of the positive electrode current collector terminal 22. Because the cut-outs 22c1 are formed in the edges of the slits 22c in the current collector plate portion 22b, warpage that occurs in the base plate portion 22a is small. As a result, the base plate portion 22a is kept in substantially a flat condition. This serves to reduce the risk of causing problems in the current interrupt mechanism 40, which needs to be fitted to the base plate portion 22a. Moreover, in the case of the negative electrode current collector terminal 24 as well, warpage that occurs in the base plate portion 24a when clamping the exposed portions 20b3 of the negative electrode sheets 20b is kept small, as illustrated in FIG. 3. The base plate portion 24a of the negative electrode current collector terminal 24 is fitted to the lid 32 via the gasket 46. Because the cut-outs 24c1 are formed in the edges of the slits 24c of the current collector plate portion 24b, warpage that occurs in the base plate portion 24a of the negative electrode current collector terminal 24 is kept small. As a result, when fitting the negative electrode current collector terminal 24 to the lid 32, gaps do not form easily at the portions where the lid 32 and the gasket 46 and the negative electrode current collector terminal 24 are fitted, so problems are unlikely to occur.

Furthermore, because the plurality of slits 22c and 24c extend into the curved portions 22d and 24d, which are provided between the base plate portions 22a, 24a and the current collector plate portions 22b, 24b, the exposed portions 20a3 and 20b3 can be fitted deeply into the slits 22c and 24c. This allows the base plate portions 22a and 24a of the positive electrode current collector terminal 22 and the negative electrode current collector terminal 24 to be arranged close to the electrode assembly 20. As a result, the positive electrode current collector terminal 22 and the negative electrode current collector terminal 24 can be arranged compactly in the battery case 30, so the electrode assembly 20 can be made larger within the battery case 30. In particular, this serves to increase the area in which the positive electrode active material layers 20a2 and the negative electrode active material layers 20b2 overlap, and as a result, serves to increase the battery capacity. Moreover, in laser welding, laser light is less likely to leak into the electrode assembly 20, so it is possible to carry out laser welding appropriately. This makes it possible to improve the welding quality between the positive electrode current collector terminal 22 and the exposed portions 20a3 of the positive electrode sheets 20a and the welding quality between the negative electrode current collector terminal 24 and the exposed portions 20b3 of the negative electrode sheets 20b. It should be noted that the welding of the positive electrode current collector terminal 22 with the exposed portions 20a3 of the positive electrode sheets 20a, as well as the welding of the negative electrode current collector terminal 24 with the exposed portions 20b3 of the negative electrode sheets 20b, does not need to be achieved by laser welding, but any appropriate welding technique may be employed.

Moreover, in this embodiment, the plurality of slits 22c and 24c of the current collector plate portions 22b and 24b extend into the base plate portion 22a and 24a, respectively (see FIG. 3). This means that less force is required to deform the current collector plate portions 22b and 24b. The gaps between the inner side surfaces of the slits 22c, 24c and the exposed portions 20a3, 20b3 can be made smaller.

As illustrated in FIG. 3, this embodiment illustrates an embodiment in which the plurality of slits 22c and 24c of the current collector plate portions 22b and 24b extend into the base plate portions 22a and 24a, respectively. The positive electrode current collector terminal 22 and the negative electrode current collector terminal 24 are not limited to such an embodiment. The positive electrode current collector terminal 22 and the negative electrode current collector terminal 24 respectively include the base plate portions 22a and 24a and the current collector plate portions 22b and 24b, each of which is in a plate shape. The base plate portions 22a and 24a and the current collector plate portions 22b and 24b are arranged to form an angular shape, and disposed so as to fit corner portions of the electrode assembly 20. In such an embodiment, it is desirable that the slits 22c and 24c be formed with a certain depth (i.e., width) in the current collector plate portions 22b and 24b, from the viewpoint of ensuring a large effective area of the positive electrode active material layer 20a2 and the negative electrode active material layer 20b2, which contributes to the battery reaction. This serves to increase the area in which the positive electrode active material layers 20a2 and the negative electrode active material layers 20b2 overlap in the battery case 30, and as a result, serves to increase the battery capacity even with the same volume of the battery case 30. In other words, it is possible to provide the secondary battery 10 with a higher energy density. From this viewpoint, the slits 22c and 24c may not extend into the curved portions 22d and 24d, or the base plate portions 22a and 24a.

In this embodiment, the cut-outs 22c1 and 24c1 are formed respectively in opposing side edges of all the slits 22c and 24c of the current collector plate portions 22b and 24b. The cut-outs 22c1 and 24c1 may be formed in the edges of some of the slits 22c and 24c, among the plurality of slits 22c and 24c of the current collector plate portions 22b and 24b. That is, it is not necessary that the cut-outs 22c1 and 24c1 be formed in the opposing side edges of all the slits 22c and 24c. In a preferable embodiment, it is desirable that the cut-outs 22c1 and 24c1 be respectively formed in the any one edge of all the slits 22c and 24c of the current collector plate portions 22b and 24b. More preferably, the cut-outs 22c1 and 24c1 should be formed respectively in the opposing side edges of all the slits 22c and 24c of the current collector plate portions 22b and 24b.

It is also possible that, in addition to the edges of the slits 22c and 24c, or alternatively, in place of the edges of the slits 22c and 24c, cut-outs may be formed in edges 22b1 and 24b1 extending along a direction orthogonal to the base plate portions 22a and 24a of the current collector plate portions 22b and 24b. This enables the current collector plate portions 22b and 24b to be deformed with a smaller force than that required when the cut-outs are formed in the edges 22b1 and 24b1 extending along a direction orthogonal to the base plate portions 22a and 24a of the current collector plate portions 22b and 24b. The gaps between the inner side surfaces of the slits 22c, 24c and the exposed portions 20a3, 20b3 can be made smaller. Thus, the cut-out (s) should be formed in at least one edge among the edges of the plurality of slits 22c and 24c and the edges 22b1 and 24b1 of the current collector plate portions 22b and 24b extending along a direction orthogonal to the base plate portions 22a and 24a, in the positive electrode current collector terminal 22 and the negative electrode current collector terminal 24. This enables the current collector plate portions 22b and 24b to deform with a smaller force, and enables the gaps between the inner side surfaces of the slits 22c and 24c and the exposed portions 20a3 and 20b3 to be smaller. It is also possible that each of the edges 22b1 and 24b1 be formed with a plurality of cut-outs. Furthermore, it is desirable that the cut-out formed in each of the edges 22b1 and 24b1 be formed between the curved portions 22d and 24d and the longitudinal midpoints of the current collector plate portions 22b and 24b.

Hereinbelow, modified examples will be illustrated about the positions at which the cut-outs 22c1 are provided in the positive electrode current collector terminal 22. FIGS. 10 to 16 are perspective views illustrating various modified examples of the positive electrode current collector terminal 22.

The positive electrode current collector terminal 22 may include a plurality of slits 22c formed in the current collector plate portion 22b, and some of the slits 22c may not be formed with the cut-outs 22c1. For example, in the embodiment shown in FIG. 10, the cut-out 22c1 is not formed in the left side edge of the middle one of the three slits 22c that are formed in the current collector plate portion 22b.

In the positive electrode current collector terminal 22, the positions at which the plurality of slits 22c are formed in the current collector plate portion 22b may be adjusted as appropriate. For example, in the embodiment shown in FIG. 11, the position at which the cut-outs 22c1 are formed in the two opposite ones of the three slits 22c formed in the current collector plate portion 22b is closer to the curved portion 22d than the position at which the cut-outs 22c1 are formed in the middle one of the slits 22c. Alternatively, in the embodiment shown in FIG. 12, a plurality (two) of cut-outs 22c1 are formed in each of the edges of the two slits 22c located on opposite sides, among the three slits 22c formed in the current collector plate portion 22b.

Figure 13:
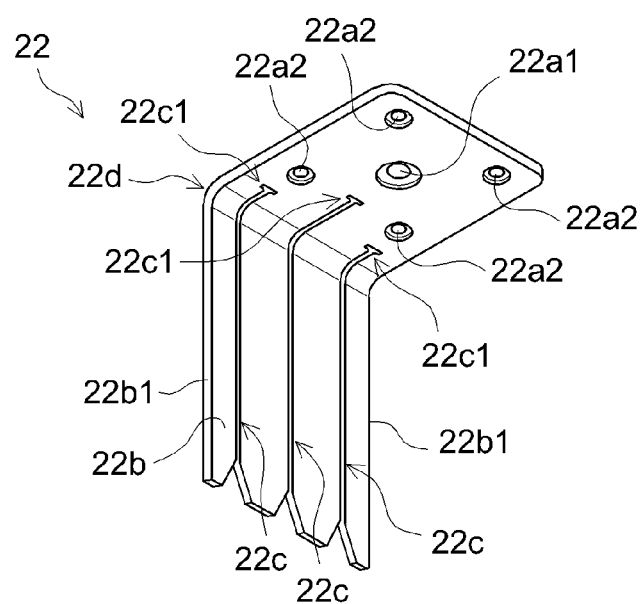
FIG. 13 is a perspective view illustrating a modified example of the positive electrode current collector terminal 22.
Figure 14:
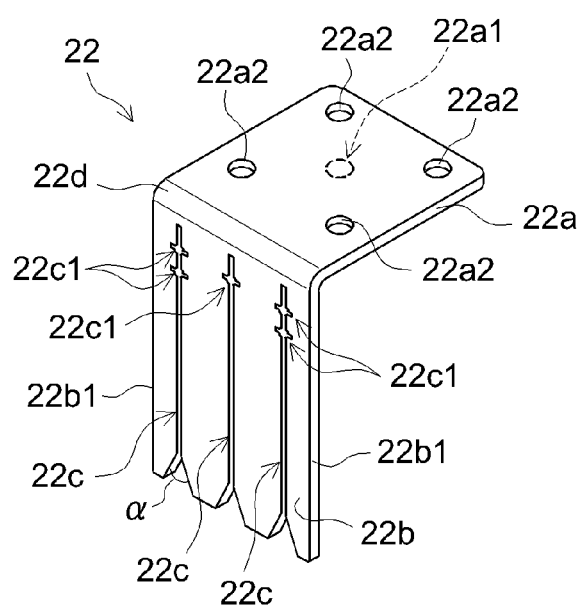
FIG. 14 is a perspective view illustrating a modified example of the positive electrode current collector terminal 22.
Figure 15:
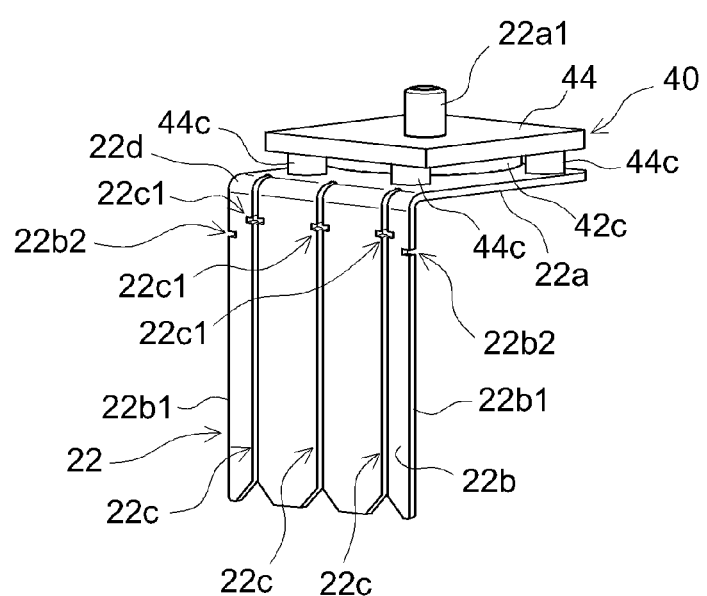
FIG. 15 is a perspective view illustrating a modified example of the positive electrode current collector terminal 22.
Figure 16:
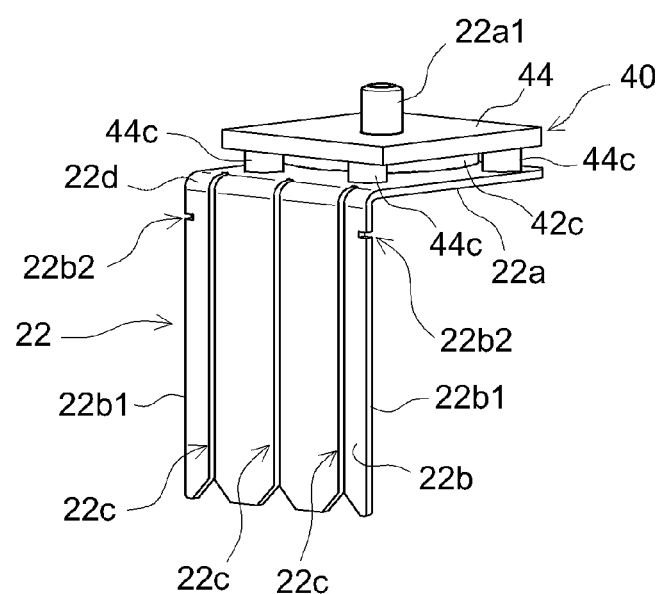
FIG. 16 is a perspective view illustrating a modified example of the positive electrode current collector terminal 22.

In the embodiment shown in FIG. 13, each of the three slits 22c formed in the current collector plate portion 22b extends to a position in the base plate portion 22a that does not interfere with the current interrupt mechanism 40. Also, each of the slits 22c includes a cut-out 22c1 formed in the base plate portion 22a. In the embodiment shown in FIG. 14, each of the three slits 22c formed in the current collector plate portion 22b does not extend to the curved portion 22d. In other respects, this embodiment is identical to that shown in FIG. 12. In the embodiment shown in FIG. 15, in addition to the cut-outs 22c1 formed in the edges of the slits 22c, cut-outs 22b2 are formed in the edges 22b1 extending along a direction orthogonal to the base plate portion 22*a* of the current collector plate portion 22*b*. In the embodiment shown in FIG. 16, the edges of the slits 22*c* are not provided with the cut-outs, but the edges 22*b*1 of the current collector plate portion 22*b* extending along a direction orthogonal to the base plate portion 22*a* of the current collector plate portion 22*b* are formed with cut-outs 22*b*2. As illustrated above, the cut-out(s) should be formed in at least one edge among the edges of the slits 22*c* and 24*c* and the edges 22*b*1 and 24*b*1 of the current collector plate portions 22*b* and 24*b*. The shape of each cut-out and the positions and the numbers of the cut-outs formed in the edges are not limited to the embodiments illustrated in the drawings, but may be modified as appropriate. Although various modified examples are illustrated herein, the configurations of the current collector terminal proposed in the present application are not limited to such examples. The configurations illustrated in the modified examples may be combined in any way.

Thus, it is desirable that, when the two opposite side edges 22*b*1, 24*b*1 of each of the current collector plate portions 22*b* and 24*b* are clamped and pressed, the exposed portions 20*a*3 and 20*b*3 should be clamped appropriately by the opposing side edges of the slits 22*c* and 24*c*. Moreover, it is desirable that the warpage that occurs in the base plate portions 22*a* and 24*a* due to the deformation of the current collector plate portions 22*b* and 24*b* be kept small. From such a viewpoint, the cut-outs 22*c*1 and 24*c*1 should be formed at appropriate positions in the edges of appropriate slits 22*c* and 24*c* among the plurality of slits 22*c* and 24*c* of the current collector plate portions 22*b* and 24*b*. From such a viewpoint, it is desirable that, for example, the cut-out(s) 22*c*1 be formed in an edge of at least one of the plurality of slits 22*c* in the positive electrode current collector terminal 22. Likewise, it is desirable that the cut-out(s) 24*c*1 be formed in an edge of at least one of the plurality of slits 24*c* in the negative electrode current collector terminal 24. In this case, the warpage that occurs in the base plate portions 22*a* and 24*a* due to the deformation of the current collector plate portions 22*b* and 24*b* can be kept smaller than the warpage that occurs when such cut-outs 22*c*1 and 24*c*1 are not formed in the edges of the slits 22*c* and 24*c*.

Furthermore, although the example shown in FIG. 1 illustrates that the current interrupt mechanism 40 is attached to the positive electrode current collector terminal 22, it is possible that the current interrupt mechanism 40 may be provided for at least one of the positive electrode terminal 22 and the negative electrode terminal 24. Accordingly, the current interrupt mechanism 40 may be attached to the negative electrode current collector terminal 24. It is also possible that the secondary battery 10 may not be provided with the current interrupt mechanism 40.

This embodiment has illustrated an example in which the positive electrode current collector terminal 22 and the negative electrode current collector terminal 24 are made by a pressing process of a single plate. In this case, the base plate portions 22*a* and 24*a* are curvedly continuously with the current collector plate portions 22*b* and 24*b*, respectively. The positive electrode current collector terminal 22 and the negative electrode current collector terminal 24 are not limited to such an embodiment. For example, the base plate portions 22*a* and 24*a* and the current collector plate portion 22*b* and 24*b* may be formed by welding flat plates together.

Various embodiments of the secondary battery and the current collector terminal proposed herein have been described hereinabove. The embodiments of the secondary battery and the current collector terminal described herein do not limit the scope of the present invention, unless specifically stated otherwise.

What is claimed is:
1. A secondary battery comprising:
a plurality of positive electrode sheets;
a plurality of negative electrode sheets;
a positive electrode current collector terminal; and
a negative electrode current collector terminal,
each of the positive electrode sheets comprising:
  a rectangular-shaped positive electrode current collector foil; and
  a positive electrode active material layer provided on the positive electrode current collector foil except for an exposed portion defined along one side of the rectangular-shaped positive electrode current collector foil,
each of the negative electrode sheets comprising:
  a rectangular-shaped negative electrode current collector foil; and
  a negative electrode active material layer provided on the negative electrode current collector foil except for an exposed portion defined along one side of the rectangular-shaped negative electrode current collector foil;
wherein:
the positive electrode active material layers and the negative electrode active material layers are alternately stacked on top of another in a thickness direction with separators interposed therebetween;
the exposed portions of the plurality of positive electrode sheets protrude from one lateral side of the separators; and
the exposed portions of the plurality of negative electrode sheets protrude from another side of the separators that is opposite the exposed portions of the plurality of positive electrode sheets,
the positive electrode current collector terminal comprising:
  a first current collector plate portion extending along a plane orthogonal to the exposed portions of the plurality of positive electrode sheets;
  a first base plate portion being continuous with the first current collector plate portion and extending along one side of the plurality of positive electrode sheets that is orthogonal to another side thereof provided with the exposed portions;
  a plurality of slits formed from a tip end of the current collector plate portion along a direction orthogonal to the base plate portion; and
  at least one cut-out formed in at least one of an edge of the plurality of slits of the positive electrode current collector terminal and an edge of the first current collector plate portion extending along a direction orthogonal to the first base plate portion; and
the negative electrode current collector terminal comprising:
  a second current collector plate portion extending along a direction orthogonal to the exposed portions of the plurality of negative electrode sheets; and
  a second base plate portion continuous with the second current collector plate portion and extending along one side of the plurality of negative electrode sheets that is orthogonal to another side thereof provided with the exposed portions;

a plurality of slits formed from a tip end of the second current collector plate portion along a direction orthogonal to the second base plate portion; and at least one cut-out formed in at least one of an edge of the plurality of slits of the negative electrode current collector terminal and an edge of the second current collector plate portion extending along a direction orthogonal to the second base plate portion;

wherein:

the exposed portions of the plurality of positive electrode sheets are inserted in the slits of the positive electrode current collector terminal and interposed between opposing side edges of the slits of the positive electrode current collector terminal; and the exposed portions of the plurality of negative electrode sheets are inserted in the slits of the negative electrode current collector terminal and interposed between opposing side edges of the slits of the negative electrode current collector terminal.

2. The secondary battery according to claim 1, wherein:

the first base plate portion and the first current collector plate portion are curvedly continuous with each other, and each of the plurality of slits in the first current collector plate portion extends into a curved portion between the first base plate portion and the first current collector plate portion; and the second base plate portion and the second current collector plate portion are curvedly continuous with each other, and each of the plurality of slits in the second current collector plate portion extends into a curved portion between the second base plate portion and the second current collector plate portion.

3. The secondary battery according to claim 1, wherein:

each of the plurality of slits in the first current collector plate portion extends into the first base plate portion; and each of the plurality of slits in the second current collector plate portion extends into the second base plate portion.

4. The secondary battery according to claim 2, wherein:

the at least one cut-out of the positive electrode current collector terminal is formed between the curved portion and a longitudinal midpoint of the first current collector plate portion; and the at least one cut-out of the negative electrode current collector terminal is formed between the curved portion and a longitudinal midpoint of the second current collector plate portion.

5. The secondary battery according to claim 1, wherein:

the at least one cut-out of the positive electrode current collector terminal includes a plurality of cut-outs; and the at least one cut-out of the negative electrode current collector terminal includes a plurality of cut-outs.

6. The secondary battery according to claim 1, wherein:

in a tip end portion of the first current collector plate portion, each of the plurality of slits in the first current collector plate portion has a width widening toward the tip end of the first current collector plate portion; and in a tip end portion of the second current collector plate portion, each of the plurality of slits in the second current collector plate portion has a width widening toward the tip end of the second current collector plate portion.

7. A current collector terminal comprising:

a base plate portion;

a current collector plate portion being continuous with the base plate portion and extending along a direction orthogonal to the base plate portion;

a plurality of slits formed from a tip end of the current collector plate portion along a direction orthogonal to the base plate portion; and at least one cut-out formed in at least one of an edge of the plurality of slits and an edge of the current collector plate portion extending along a direction orthogonal to the base plate portion.

8. The current collector terminal according to claim 7, wherein the base plate portion and the current collector plate portion are curvedly continuous with each other, and each of the plurality of slits in the current collector plate portion extends into a curved portion formed between the base plate portion and the current collector plate portion.

9. The current collector terminal according to claim 8, wherein each of the plurality of slits extends into the base plate portion.

10. The current collector terminal according to claim 8, wherein the at least one cut-out is formed between the curved portion and a longitudinal midpoint of the current collector plate portion extending from the curved portion.

11. The current collector terminal according to claim 7, wherein the at least one cut-out includes a plurality of cut-outs.

12. The current collector terminal according to claim 7, wherein, in a tip end portion of each of the current collector plate portions, each of the plurality of slits has a width widening toward the tip end.

* * * * *